H. C. GREEN.
Cotton and Hay Press.
No. 222,038. Patented Nov. 25, 1879.
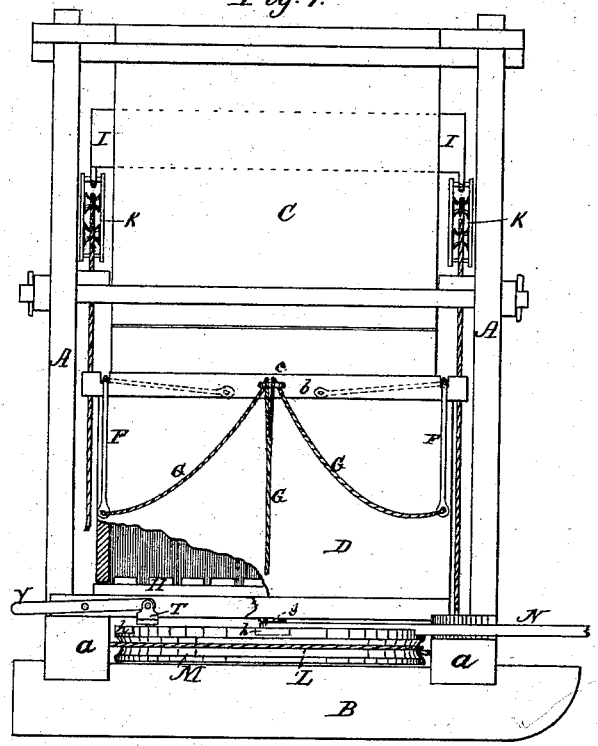
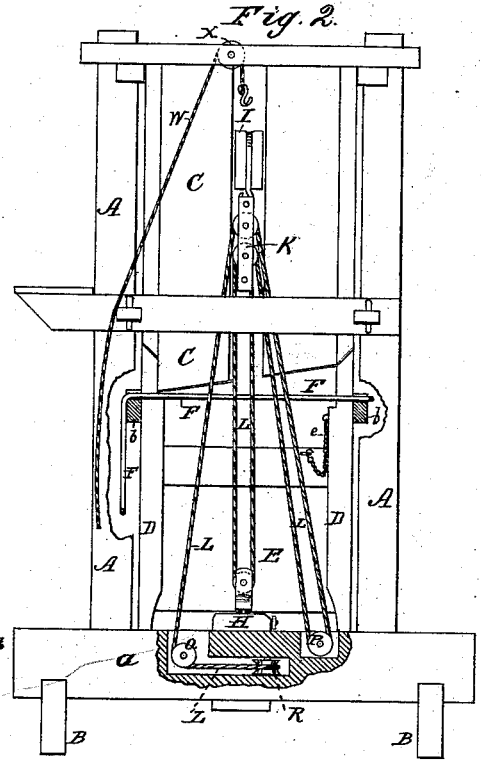
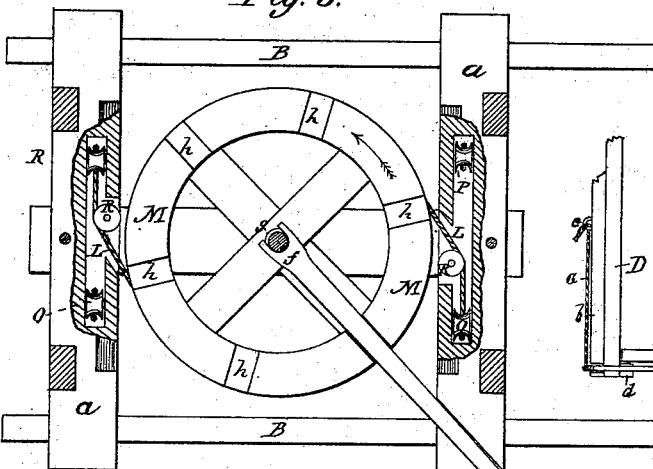
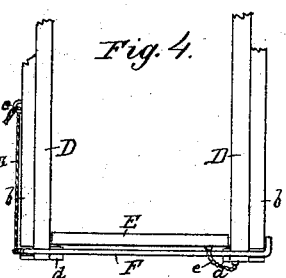
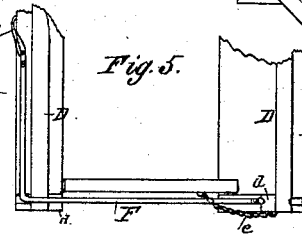
WITNESSES:
W. W. Hollingsworth
Amos W. Hart
INVENTOR:
H. C. Green
BY
ATTORNEYS.

UNITED STATES PATENT OFFICE.

HENRY C. GREEN, OF BASCOBEL, GEORGIA.

IMPROVEMENT IN COTTON AND HAY PRESSES.

Specification forming part of Letters Patent No. 222,038, dated November 25, 1879; application filed September 30, 1879.

*To all whom it may concern:*

Be it known that I, HENRY C. GREEN, of Bascobel, in the county of Jackson and State of Georgia, have invented a new and useful Improvement in Cotton and Hay Presses; and I do hereby declare that the following is a full, clear, and exact description of the same.

My invention is an improvement in the class of windlass-presses, or presses whose followers are operated by a system of ropes and pulleys. Instead of placing a windlass-shaft at each side of a vertical press-box, as usual heretofore, I arrange a wheel horizontally beneath the bed of the press, and provide it with a lever attachment, by which it is rotated and caused to take up or wind on the ropes connected with the follower.

The invention also relates to other features of improvement, as hereinafter described and claimed.

In the accompanying drawings, forming part of this specification, Figure 1 is a side view, and Fig. 2 an end view, of my improved press, part being broken away. Fig. 3 is a plan view of the bottom portion of the press, part being broken away. Fig. 4 is a detail plan view of the detachable sides and one end of the press-box. Fig. 5 is also a detail plan view of the same sides and ends in the position the expansion of the bale causes them to assume when the hook-rods F have been adjusted so as to release them from the position and engagement illustrated in Figs. 1 and 2.

The vertical frame A of the press proper is fixed on runners or slides B, to adapt it to be conveniently moved from place to place. When the press is in use the said runners are let into shallow ditches in the ground, so that it will remain fixed and steady in position. The upper half, C, of the press-box is a permanent or fixed attachment of the frame A. The lower portion of the press-box is composed of four detachable parts—to wit, the sides D and end pieces, E. These are held together by the following-described means:

The lower edges of the sides D enter mortises or rabbets in the sills *a* of the frame A, and their upper ends are locked together by hooks or hook-rods F. Said hooks are formed of iron rods, which are bent twice at a right angle, one arm thereof being short and the other long. The body of the rods rests in notches or open slots formed in the ends of wooden bars *b*, attached to the sides D, and the width of the press-box (including the thickness of bars *b*) being the same as the length of the body of the rods, the arms or hooks of the latter prevent the sides D separating, or, in other words, hold the sides in place so long as the longer arms of the hooks are vertical and pendent, as shown in Figs. 1, 2. A cord, G, is attached to the longer arms of the hooks and passed through an eye, *c*, so that by pulling said cord the longer arms of the hooks or rods F will be raised to a horizontal position, as indicated by dotted lines, Fig. 1, thereby bringing the shorter arms of the rods into vertical position, so that they will slide through the contiguous slots in bars *b*, and thus allow the sides D to separate. The movable end pieces, E, of the press-box are held in place by cleats *d* on the inner side of the side pieces, D, and the latter are connected with the end pieces, E, by hooks and short ropes *e*, so that when the sides D are released by pulling cord G and detached or drawn away from the frame A the end pieces, E, will follow them, thereby leaving the pressed cotton or other substance resting on the grooved bed H exposed to view and accessible for application of the bale-bands. After the bale has been bound and removed the sides and ends D E are replaced in their normal position and secured by hook-rods F, as before, and the press is then so far ready for operation upon another quantity of cotton, hay, &c.

I will now proceed to describe the parts for operating the follower I. The reduced ends of the latter extend through vertical slots in the ends of the upper portion, C, of the press-box. The means for operating the follower consist, mainly, of systems of pulleys K, the ropes L, wheel M, and lever N. The pulleys are attached to the projecting ends of the follower I, and the rope L, connected with the frame of each set of pulleys, runs on pulleys O P R, which are fixed in the bed of the press. The pulleys P R are located in slots in the sills, and from the pulleys R the ropes extend to the wheel M, to whose grooved periphery they are attached. By turning the wheel to the right the ropes L will be wound on it, and the follower thereby drawn down, so as to compress the cotton or other substance in the press-box.

The lever N is forked at its inner end, $f$, to adapt it to embrace the axis of wheel M between the collars $g$ thereof. The rim of the wheel is provided with notches $h$ on the upper side to receive the body of the lever N. The lever is lifted out of a notch and placed in another after each movement of the wheel M has been effected by application of the requisite force to the outer end of the lever. The operation of the wheel is thus intermittent, and it is locked after each movement by means of a hinged pawl, T. This pawl is raised to release the wheel when the follower I has been drawn down to the desired point by means of a lever, V. The pulley blocks or frames K are then unhooked from the follower, and the latter raised by a rope and turned on one side on the top of the press-box while the latter is being refilled. The pulley-frames are then raised by ropes W running on pulleys X at top of frame A until the said frames are in position for reattachment to the follower.

What I claim is—

1. In a cotton or hay press, the combination of the hooked rods, and a rope attached thereto, and the removable sides of the press-box, having cross-brace timbers attached to their upper parts, in the slots of which said rods rest, as shown and described.

2. In a cotton or hay press, the combination of the removable sides and ends of the press-box and the cords, hooks, and staples connecting said sides and ends, as and for the purpose specified.

3. In a cotton or hay press, the combination, with the press-box and follower, of the sets of pulleys attached to the latter, the ropes L, the fixed pulleys on which the ropes run, and a grooved wheel placed beneath the bed of the press and provided with a lever for operating it, as shown and described.

HENRY CLAY GREEN.

Witnesses:
 JONATHAN HAMPTON,
 T. H. DEARING.